United States Patent [19]
Florindez

[11] Patent Number: 6,065,390
[45] Date of Patent: May 23, 2000

[54] BAKERY PAN INDEXING APPARATUS AND METHOD

[76] Inventor: Augusto Florindez, 13029 Ocaso Ave., La Mirada, Calif. 90638

[21] Appl. No.: 09/199,256

[22] Filed: Nov. 24, 1998

[51] Int. Cl.⁷ .............................. A47J 27/00; B65G 47/00
[52] U.S. Cl. ................................. 99/334; 99/353; 99/386; 99/443 C; 198/431; 198/463.4; 198/464.2; 53/251; 53/534
[58] Field of Search ...................... 99/331–334, 352–355, 99/426, 427, 440, 443 R, 443 C, 386; 53/55, 67, 505, 534, 539, 246, 251; 198/690.1, 464.2, 464.3, 463.4, 465.1, 431, 418.6

[56] References Cited

U.S. PATENT DOCUMENTS

| | | | |
|---|---|---|---|
| 2,837,942 | 6/1958 | Laval, Jr. | 99/494 |
| 3,716,383 | 2/1973 | Yamamura | 99/353 |
| 3,954,204 | 5/1976 | Becker | 221/266 X |
| 4,051,772 | 10/1977 | Johansson et al. | 99/427 |
| 4,308,974 | 1/1982 | Jones | 221/266 |
| 4,329,920 | 5/1982 | Rose et al. | 99/450.1 |
| 4,448,116 | 5/1984 | Muzzarelli | 99/494 |
| 4,668,524 | 5/1987 | Kirkpatrick | 99/353 |
| 4,815,959 | 3/1989 | Stoeckli et al. | 99/353 |
| 4,945,825 | 8/1990 | Florindez | 99/427 |
| 5,033,367 | 7/1991 | Florindez | 99/353 |
| 5,060,562 | 10/1991 | Florindez | 99/353 |
| 5,476,035 | 12/1995 | Florindez | 99/443 C |

Primary Examiner—Timothy Simone
Attorney, Agent, or Firm—John J. Connors; Connors & Assoc.

[57] ABSTRACT

A conveyor indexing mechanism for a bakery production line includes a variable speed motor, a conveyor, a number of baking pans, a dough packet drop mechanism, a sensor, and a timing generator. The conveyor moves the baking pans under the dough packet drop mechanism at a base speed and a ramp-up speed based on input from the sensor and timing generator. The sensor senses pan pockets in the baking pans which causes the motor to assume the base speed. The timing generator periodically causes the motor to assume the ramp-up speed. The indexing mechanism ensures that a row of pan pockets will be below the dough packet drop mechanism so that a row of dough packets will consistently fall therein with maximum throughput. The absence of any clutch or brake reduces wear, as does the continuous motion of the drive train, which prevents backlash in the gear components. A programmable controller receives system inputs and instructs an inverter to change the motor speed. A pair of potentiometers can easily set the base and ramp-up speeds.

4 Claims, 10 Drawing Sheets

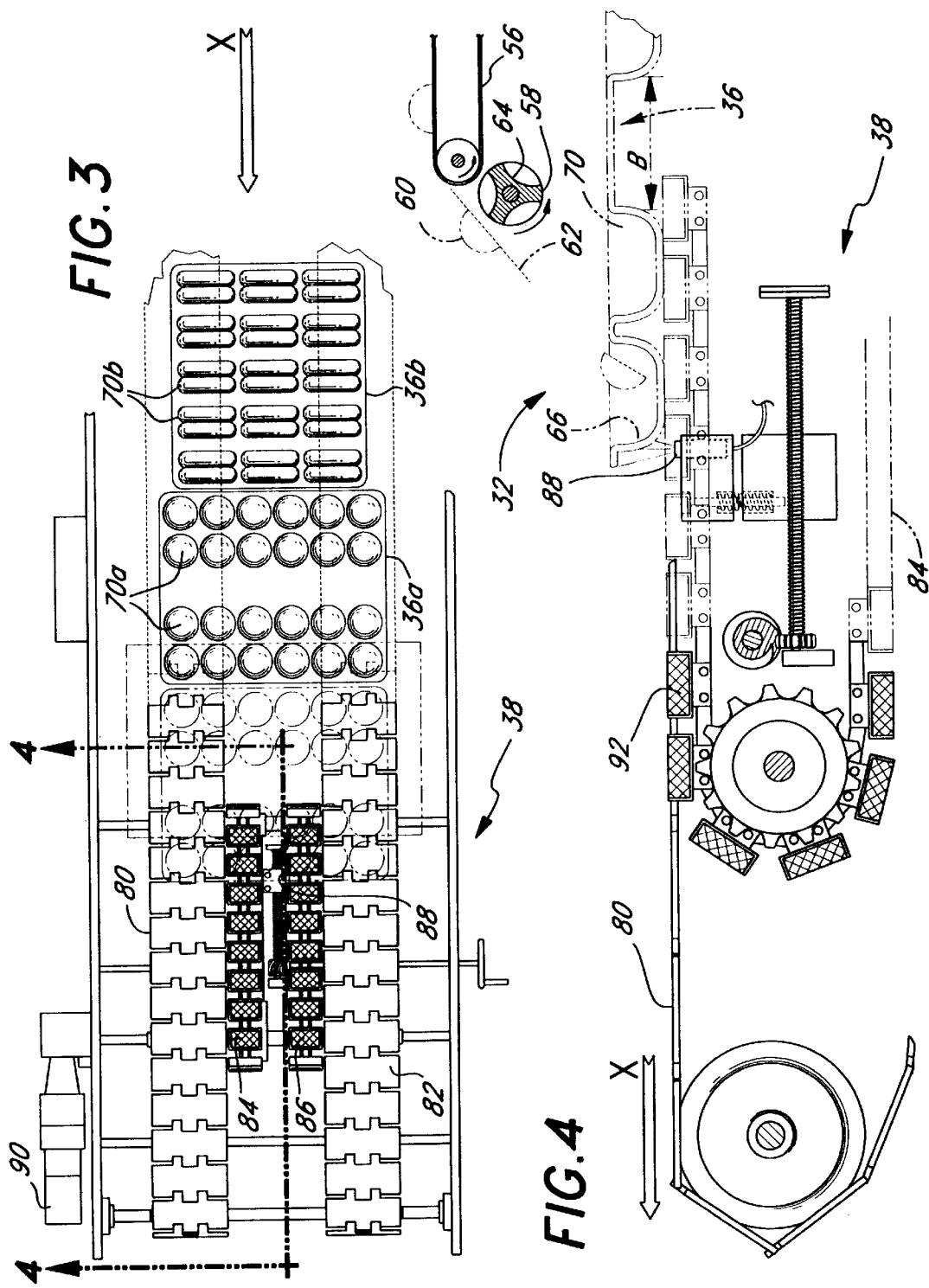

BAKERY PAN INDEXING APPARATUS AND METHOD

BACKGROUND OF THE INVENTION

1. Field of the Invention

This invention relates to apparatus for moving a bakery pan in an efficient fashion past a position where rows of dough packets are deposited in individual cavities or pockets in the pan. In particular, the invention relates to a variable speed indexing apparatus that alternately slows and speeds the progression of the pan past the position at which the dough packets are deposited.

2. Background of the Invention

In the baking industry, baking pans move in a stepwise fashion past a device that provides dough packets. The pans include a number of rows of cavities or pockets for receiving the dough packets. The pans are positioned one after another in series, usually with a leading edge of one pan abutting the trailing edge of another. Frequently, the type of bakery product being manufactured varies and the configuration of the pans used must be changed. For example, when making hamburger buns, the pans include rows of round pockets, and when making hotdog buns the pans include rows of oblong shaped pockets. The individual pockets include a leading edge and a trailing edge with individual pockets and are spaced apart from each other in the direction of pan travel.

The soft dough packets make it somewhat difficult to drop straight rows for deposition into corresponding rows of pockets in each pan. That is, after being divided into individual dough packets, transverse rows of dough packets translate through a mechanized conveyor system and drop from an elevation above the moving baking pans. To insure that a complete transverse row of dough packets is received into a corresponding row of pan pockets, a pan conveyor indexing mechanism is typically used to stop a row of pan pockets underneath where the dough packets are dropped. One indexing mechanism is disclosed in U.S. Pat. No. 5,476,035 to Florindez which utilizes a conveyor belt having magnetic elements to attract the bottom side of the pans. A motor drives the conveyor belts and a clutch/brake mechanism operates to alternately stop and start the conveyor movement. A proximity sensor senses the individual pan pockets, wherein the motor is disengaged and the brake applied. A timing clock operates to release the brake and re-engage the motor. The conveyor belt thus moves in a stepwise fashion past the location where dough packets are deposited in the pan pockets.

As mentioned, the type of baked goods being produced changes without stoppage of the conveyance system. Such changes introduced different types of baking pans in sequence. At the transition between different types of baking pans, the spacing between transverse rows of pan pockets changes. In addition, sequential baking pans may not be touching, resulting in gaps therebetween.

FIG. 1 diagramatically illustrates several sections in the movement of a baking pan in the prior art indexing system. At the upper portion, sequential baking pans 20a and 20b travel to the left, with the associated magnetic conveyor not been shown for simplicity. Each baking pan has transverse rows of pan pockets spaced apart in the direction of pan travel. Thus, for example, baking pan 20a has pans P1 through P4, and a baking pan 20b has a at least a first row of pan pockets P5. Below the schematically illustrated baking pans 20 is a graph with the speed of the pans in inches/second on the Y-axis and time in 0.5 second intervals on the X-axis. A base speed of pan travel is set at approximately 20 in./sec. The base speed approximates the speed at which all dough packets would fall into the correct pan pocket if the dropping of the dough packets were perfectly in synch with the pan movement. In reality, as mentioned, a number of factors contribute to disrupt this synchronism. For example, different gaps G between pans and varied spacing S between rows of pan pockets create uneven distances between adjacent rows and thus vary the timing of when sequential rows reach the drop point.

To adapt to the uneven pan pocket row timing, a proximity sensor in the system senses the leading edge of each of the pan pockets as indicated at A1 through A5. A periodic timing signal every 0.5 seconds is also provided as indicated at B1 through B5. The timing signal is synchronized to the moment when a dough packet drops from an elevation above the baking pan, after which time the pan speed should then pick up. In some instances, a slight phase difference between the actual time the rows of dough packets drop and the timing signal may be desirable to improve efficiency. Nonetheless, the timing signals are evenly spaced apart the same period as the spacing between drops of dough packet rows.

With reference to FIG. 1, prior to the first row of pan pockets P1, the baking pans 20 travel at the base speed. A1 indicates when the proximity sensor senses the leading edge of pan pocket P1 (time t1). The clutch disengages and brake engages to momentarily stop pan travel at time t2. A short time later, the periodic timing signal B1 is received by the control circuitry at time t3. This means a row of dough packets is dropping. At this point, the brake disengages and the clutch engages to begin ramping up the pan travel speed to the original base speed at time t4. The pans continue to travel at the base speed until the leading edge of the second row of pan pockets P2 is sensed by the proximity sensor (A2). This sequence of stopping and starting is repeated for each row of pan pockets.

In an efficient mode of operation, the indexing mechanism of the prior art will exhibit a waveform as indicated at 24 characterized by a spike from the base speed to the lower speed when the leading edge of a row of pan pockets is sensed. This temporary reduction in speed of pan travel is all that is necessary to insure that the dough packets are received in the pockets. In actual operation, however, the trapezoidal-shape waveform, such as at 26, occurs just as frequently as the spikes 24. In other words, the pans pause underneath the location at which the dough packets are dropped for a longer time than is necessary. This introduces an inefficiency in the overall throughput of the system. Moreover, the indexing mechanism of the prior art is limited in its capacity to adapt to different frequencies of pan pockets.

Another problem with the prior art indexing mechanism is the wear inherent in the mechanical components. The repetitive stopping and starting may cause eventual breakdown of the motor/clutch/brake drive system, or one of the components thereof. More problematic is the wear imposed on the gear train. Every time the gear train stops there is some backlash when the motion of the meshing components reverses. Continual backlash eventually wears the expensive gear train.

Although the indexing apparatus of the prior art generally work well to insure that a complete row of dough packets is received into each row of pan pockets, the constant stopping of the bakery pans slows down the overall efficiency of the system. Furthermore, the motor/clutch/brake drive mechanism eventually wears down and must be replaced. There is thus a need for an efficient conveyor system which requires less maintenance and lasts longer.

Such prior art indexing apparatus could employ stepper motors which are of the brushless-high rpm type that can be driven in a stop-start mode without many problems as opposed to a regular AC motor. A vector controlled drive may be designed to make a pattern by stopping and accelerating "ON" and "OFF" constantly without overheating the motor. A vector controller controls the pattern of timing and sequencing of the stepper motor by its programmed logic in its inboard programmable logic controller. But the overall cycles per minute of the stepper motor is not unlimited. In contrast, using the present invention which employs an AC inverter, the number of cycles is virtually unlimited.

SUMMARY OF THE INVENTION

Briefly, this invention is an apparatus for moving a bakery pan having rows of pockets to underneath a location at which dough packets are dropped. Each of the pockets has a leading edge and a trailing edge. The apparatus includes a variable speed gear motor, a conveyor driven by the gear motor for moving a pan in series along a predetermined path, a signal generator which provides a timing signal at equal intervals, a sensor along the path that provides a position signal each time a leading edge of a pocket reaches a predetermined point along the path, and an inverter connected to the motor which is responsive to the timing and position signals to regulate the speed of the motor. The inverter signals the motor to operate alternately at a base speed each time the position signal is received, and at a second speed greater than the base speed each time a timing signal is received. The second speed is equal to the base speed plus an incremental speed added thereto.

The apparatus of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which includes accurate and efficient control of the movement of baking pans below an apparatus which drops dough packets.

The first feature of the indexing apparatus of this invention is the variable speed gear motor which drives the conveyor to move the pans in series along the predetermined path.

The second feature is that the signal generator provides a timing signal at equal intervals.

The third feature is that the sensor provides a position signal each time the leading edge of a pocket reaches a predetermined point along the path.

The fourth feature is that the inverter is responsive to the timing and position signals to regulate the speed of the motor. This inverter signals the motor to operate at a constant base speed each time the position signal is received by the inverter, and at a second speed greater than the base speed. The second speed is equal to the base speed plus a constant incremental speed added to the base speed each time the timing signal is received by the inverter.

The fifth feature is a manually adjustable regulator for setting the base speed and a manually adjustable regulator for setting the constant incremental speed. As used herein, "manually" includes the use of touch a pad logic interface programmable controller (PLC) or equivalent device.

This invention also includes a method of conveying baking pans having rows of pan pockets underneath a dough packet drop location. This method includes:

conveying the pans at a base speed with a gear motor;

sensing a leading edge of at least one pan pocket in each row of pan pockets in proximity to the dough packet drop location;

generating a signal upon sensing said leading edge;

transmitting the signal to a controller;

reducing the speed of said motor upon receiving the transmitted signal;

generating a timing signal referenced to a frequency at which dough packets are dropped at the dough packet drop location;

transmitting the timing signal to the controller; and increasing the speed of said motor upon receiving the transmitted signal.

DESCRIPTION OF THE DRAWING

The preferred embodiment of this invention, illustrating all its features, will now be discussed in detail. This embodiment depicts the novel and non-obvious indexing apparatus and method of this invention as shown in the accompanying drawing, which is for illustrative purposes only. This drawing includes the following Figures (FIGS.), with like numerals indicating like parts:

FIG. 3 is a top plan view of a baking pan conveyor mechanism forming a portion of the dough packet conveyor system;

FIG. 4 is a cross-sectional view taken along line 4—4 of FIG. 3 showing a dough packet deposition mechanism, a magnetic pan conveyor, and a proximity sensor all used in a baking pan indexing mechanism of the present invention;

DETAILED DESCRIPTION OF THE PREFERRED EMBODIMENT

The present invention provides an improved baking pan indexing mechanism which improves the throughput of the overall baking system and can rapidly adapt to various baking products. The indexing mechanism forms a part of a larger automated dough packet conveyor system, elements of which are previously described in U.S. Pat. Nos. 5,060,562 and 5,476,035. The disclosures of these prior U.S. patents are hereby expressly incorporated by reference. In addition, an improved mechanism for ensuring the delivery of a straight row of dough packets to a baking pan is described in U.S. application Ser. No. 09/156,223, filed Sep. 18, 1998, and entitled "Apparatus For Manufacturing Different Shaped Bakery Products," the disclosure of which is also hereby expressly incorporated by reference.

Figure 1:
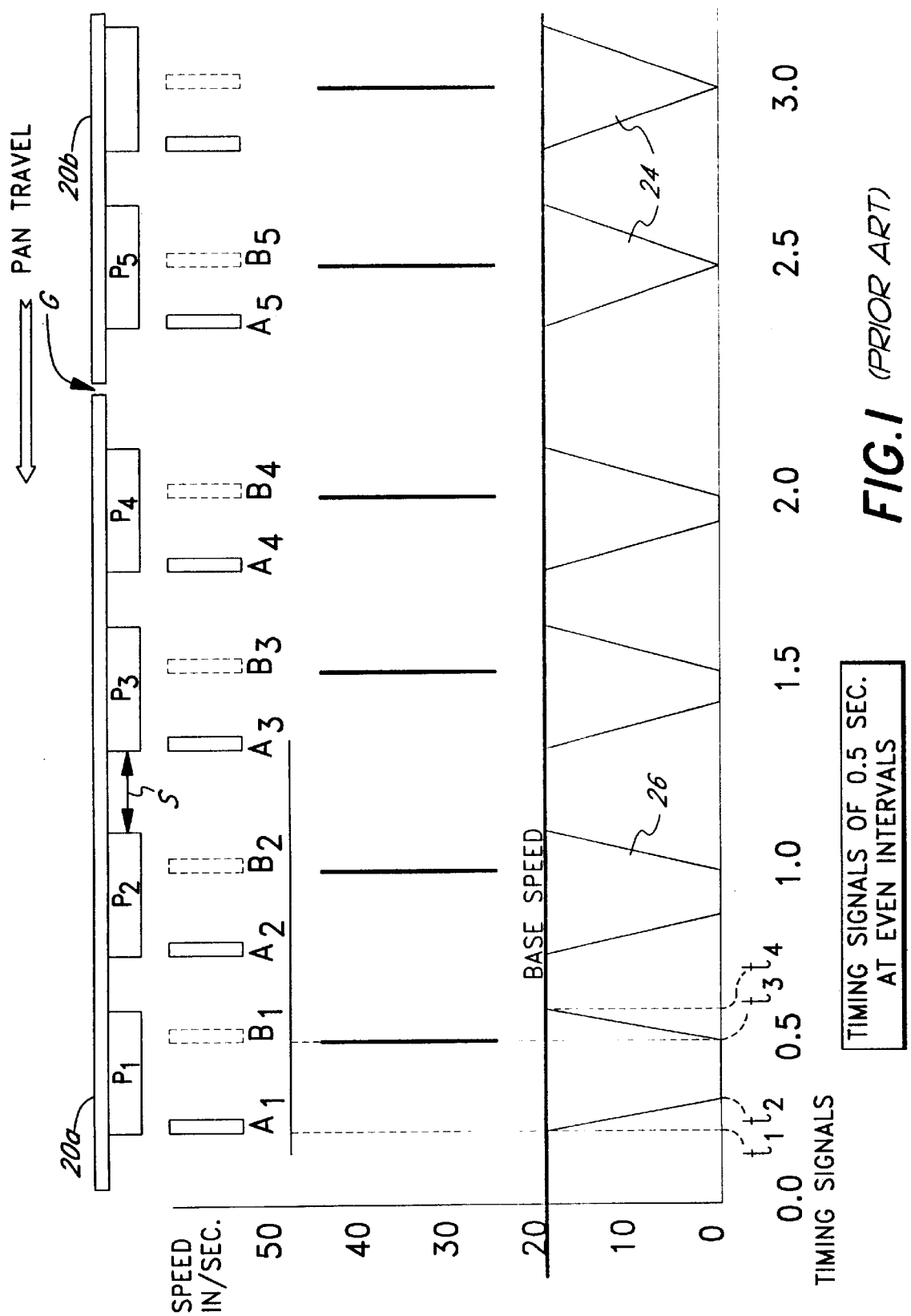
FIG. 1 is a schematic diagram illustrating the magnitude of speed of a pan conveyor in a system of the prior art utilizing a clutch/brake indexing mechanism.
Figure 2:
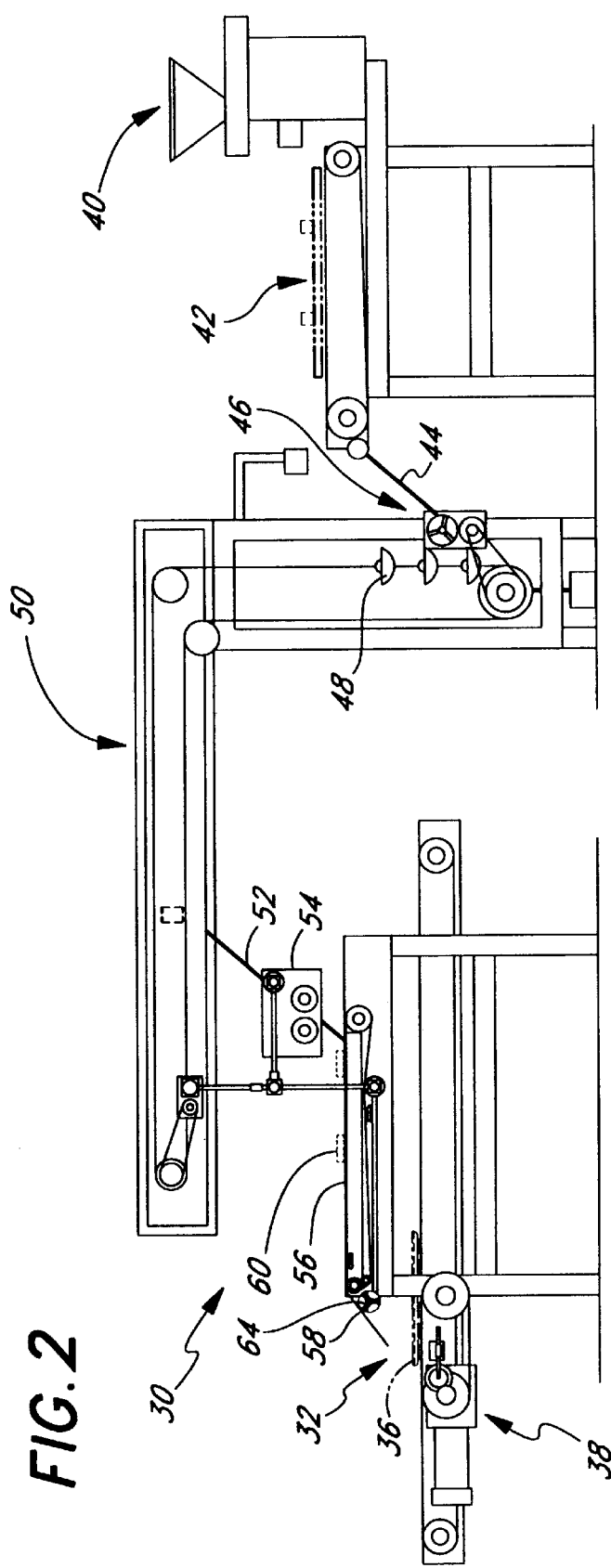
FIG. 2 is a schematic elevational view of an automated dough packet conveyor system of the present invention.

FIG. 2 illustrates a system 30 for creating rows of individual dough packets and conveying them to a location 32 above a conveyor 34 on which baking pans 36 travel. A baking pan indexing mechanism 38 of the present invention is located underneath conveyor 34, and will be described in greater detail below.

In the orientation of FIG. 2, the overall system 30 produces dough packets on the right and transfers them to the left to drop into pockets of baking pans 36. More specifically, a dough divider 40 cuts individual dough packets and distributes and supplies them in rows to a conveyor/rounder mechanism 42. The rows of dough packets fall down a chute 44 and are collected and aligned by a rotary gate 46 before being deposited in receptacles traveling on a ferris-wheel transfer mechanism 48. The dough packets continue along a horizontal portion 50 of the transfer mechanism 48 to eventually be deposited via chute 52 to another synchronizing rotary gate 54. Rotary gate 54 deposits aligned rows of dough packets on another conveyor 56 leading to the drop location 32. The drop location may comprise a simple chute, or a mechanism which synchronizes the travel of the individual dough packets so that an entire transverse row drops at once. Co-pending U.S. application Ser. No. 09/156,223 discloses an improved synchronizing mechanism incorporating a rotary gate 58. The rotary gate 58 drops an aligned row of dough packets into a row of pan pockets.

With reference now to FIGS. 3 and 4, various components of the bakery pan indexing mechanism 38 of the present invention are shown. For orientation purposes, FIG. 3 is a top plan view of the left end of the system 30 shown in FIG. 2, and the elevational view of FIG. 4 also illustrates the left end of the conveyor 56 and the rotary gate 58 above the baking pan 36. As illustrated by the movement arrows, individual dough packets 60 travel generally in rows (perpendicular to the page) along the conveyor 56 and down a chute 62 to fall into depressions 64 formed in the rotary gate 58. The rotary gate 58 includes three rows of depressions 64 oriented at 120 degrees around a central axis. Each row of dough packets 60 is received in a row of depressions 64 facing upward, and is then dropped into a row of pan pockets 70 upon counter-clockwise rotation of the gate 58 as indicated by movement arrow 68. Each pan pocket 70 includes a leading edge 66.

The gate 58 rotates in 120 degree increments and its movement is synchronized with respect to the overall system 30 to receive and drop rows of dough packets 60 at predetermined intervals. More specifically, the system 30 includes a primary clock that is coupled to the action of the dough divider 40. That is, the speed of the dough divider 40 determines the spacing between rows of dough packets, and thus represents the master timing source. The bakery pan indexing mechanism 38 has a separate drive.

As seen best in FIG. 3, two types of baking pans 36 and 38 in sequence are shown. A first type of pan 36a includes a plurality of round pockets 70a for receiving, for example, round dough packets in the shape of hamburger buns. A second type of pan 36b includes a plurality of oblong pockets 70b for receiving, for example, oblong dough packets in the shape of hotdog buns. The pans travel in the direction X (to the left in FIGS. 3 and 4) and include rows of the respective pockets 70a or 70b aligned transverse to the direction of travel. As discussed in co-pending U.S. application Ser. No. 09/156,223, in any typical manufacturing process, the system 30 may convert from producing hamburger buns to producing hotdog buns.

The indexing mechanism 38 includes a pair of conveyor belts 80 and 82, a pair of endless belts 84 and 86 disposed between the conveyor belts, a proximity sensor 88 disposed between the endless belts, and an electric motor 90 for driving the endless belts. The two conveyor belts 80 and 82 are parallel and spaced apart a sufficient distance to support the pans 36 which are moved by the belts along the path X. The pans 36 are constructed of a magnetizable material, such as steel, and the endless belts 84 and 86 comprise a plurality of permanent magnets 92 adapted to attract the bottom surface of the pans. The length of the endless belts 84 and 86 in the direction of travel is shorter than the length of conveyor belts 80 and 82, and spans a distance which is below the drop location 32. The endless belts 84 and 86 and permanent magnets 92 thus attract the pans 36 and control their linear movement in and around the drop location 32. As will be described in greater detail below, the movement of the endless belts 84 and 86 operate to insure that a complete row of dough packets 60 is received in each row of the pan pockets 70 in an efficient manner.

FIGS. 5a–d diagramatically illustrate various modes of operation of the present indexing mechanism 38. Each FIG. shows pans at the top and a number of bars below signifying two different events. The event of the proximity sensor 88 sensing the leading edge 66 of a pan is represented by the bars A, while the reception by a system controller (not shown) of the aforementioned timing signal is represented by the bars B.

Figure 5A:
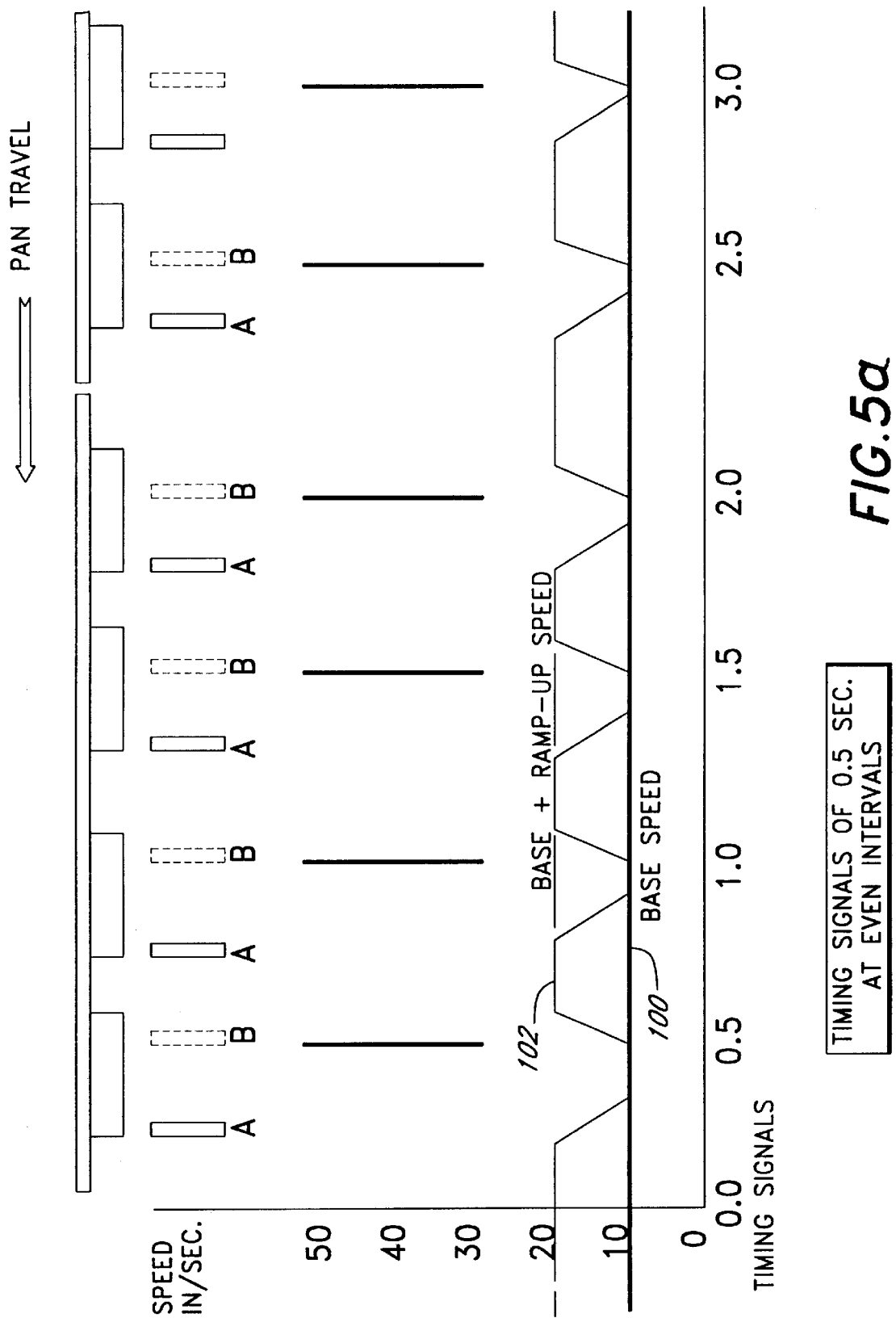
FIG. 5a is a schematic diagram illustrating the magnitude of speed of a pan conveyor in the indexing mechanism of the present invention wherein a base speed and dough packet frequency are both low.

FIG. 5a shows a pan base speed 100 of about 10 in./sec., which is relatively slow. The timing signals occur at 0.5 sec. intervals, which is also a relatively low frequency. Again, the frequency of the timing signals is determined by the speed of the dough divider 40, and may change instantaneously upon a change in the bakery product being produced. A ramp-up speed 102 is relatively fast in comparison to the base speed 100, and the transitions between the two speeds create trapezoidal waveforms.

Figure 6A:
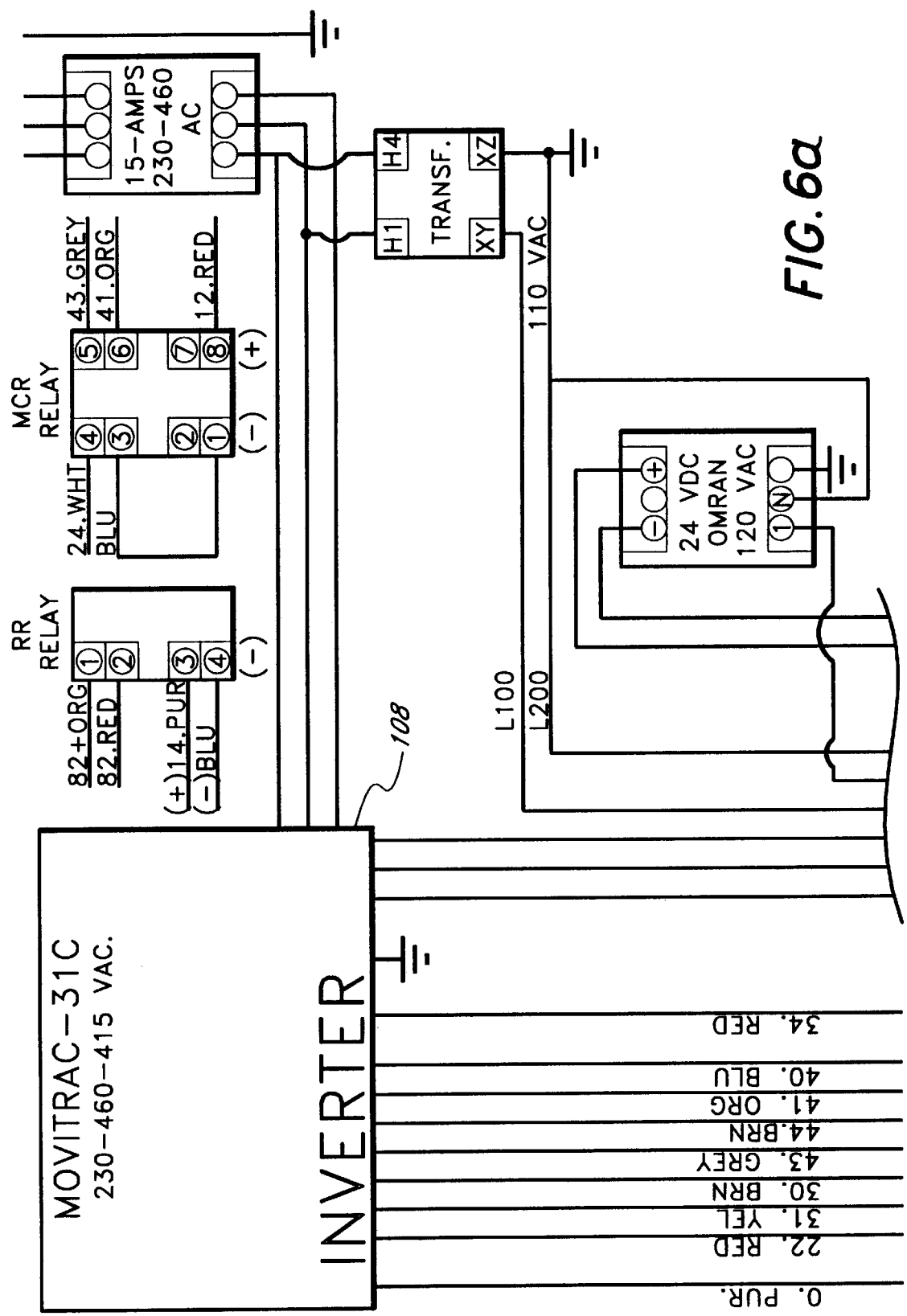
FIG. 6a is a portion of a diagram of a circuit for controlling the indexing mechanism of the present invention.
Figure 6B:
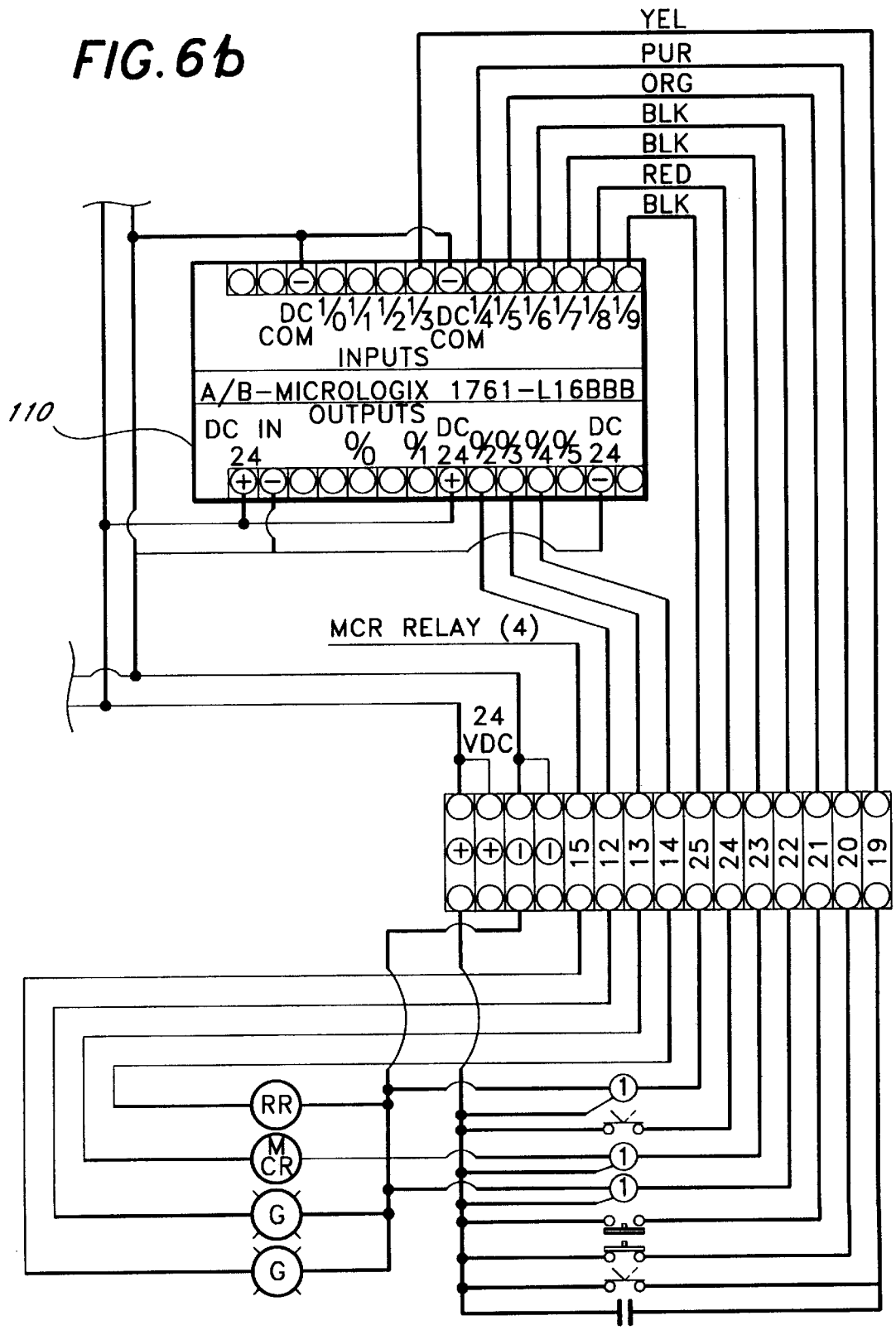
FIG. 6b is a second portion of the diagram of a circuit for controlling the indexing mechanism of the present invention.
Figure 6C:
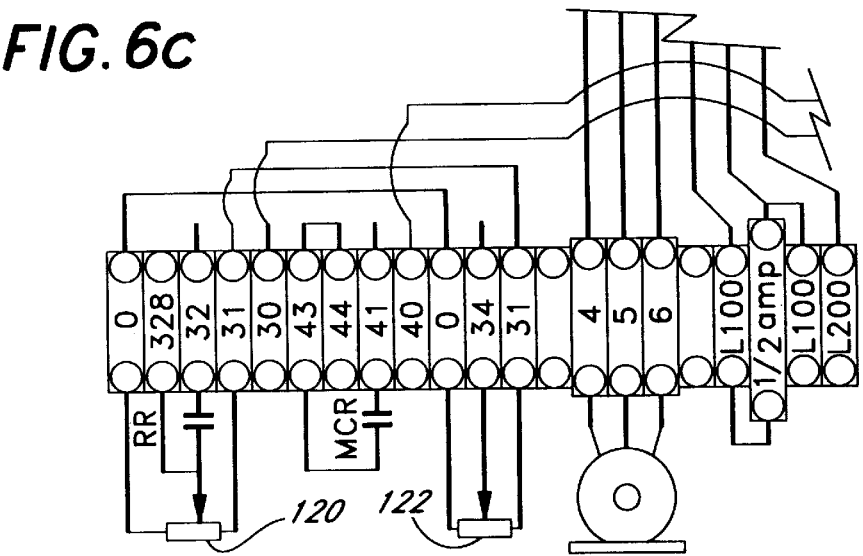
FIG. 6c is a third portion of the diagram of a circuit for controlling the indexing mechanism of the present invention.
Figure 7:
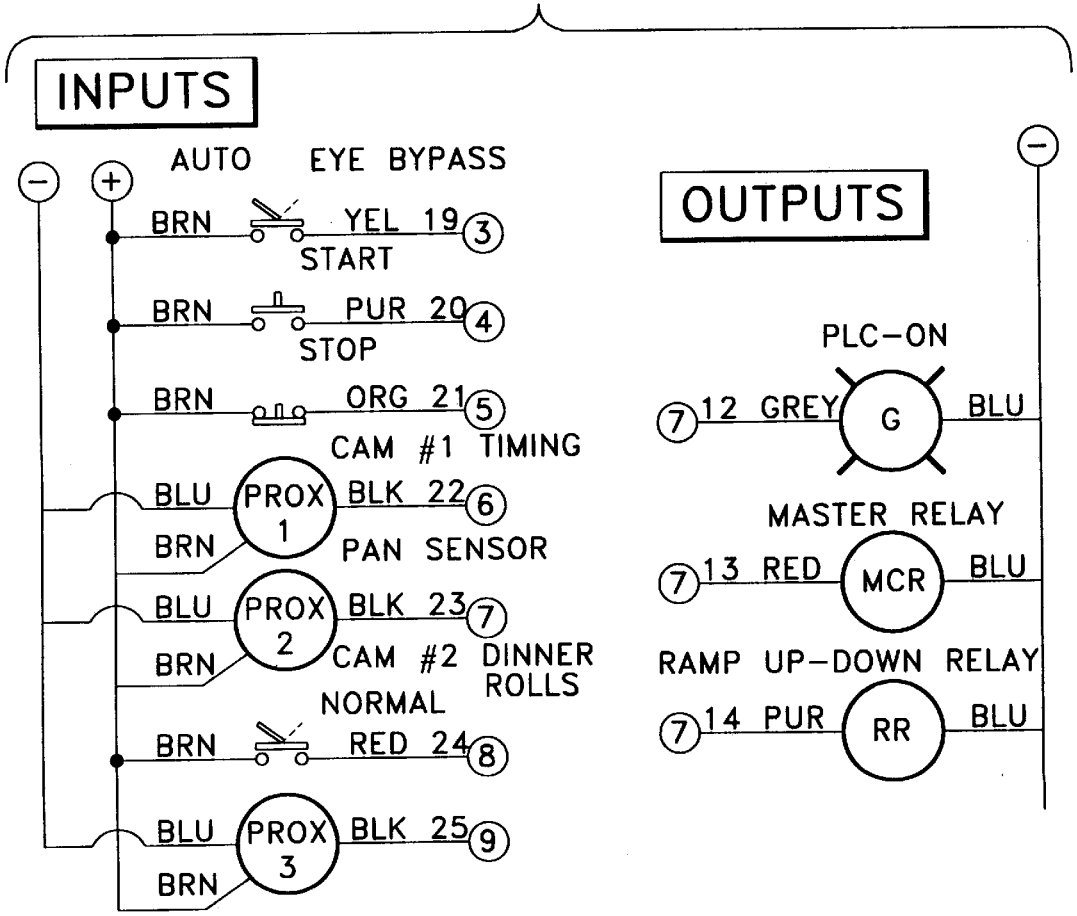
FIG. 7 is a detailed of the inputs and outputs of a programmable controller of the circuit shown in FIG. 6.

In the present invention, the clutch/brake system of the prior art is replaced with a variable speed gear motor controlled by an inverter 108 (FIG. 6). The inverter is responsive to either the event of the proximity sensor 88 sensing the leading edge 66 of a pan or the timing signal, and acts to change the speed of motor 90 between the base speed 102 and the ramp-up speed 102. Desirably, the system includes a programmable controller 110, the circuit diagram of which is seen in FIG. 6, that gathers various system inputs and outputs instructions, most notably to the inverter to change the motor speed. Specifically, the programmable controller 110 switches ON and OFF a differential reference voltage to a ramp generator terminal of the inverter 108 to alternately initiate and discontinue the ramp-up speed 102. The ramp-up differential voltage is added to the base speed voltage value, thus creating a linear sequential variable speed step-by-step indexer controlled by the programmable controller 110. The inputs and outputs of the programmable controller 10 are seen in FIG. 7. The elimination of the clutch/brake and replacement thereof with a wholly electronic speed control greatly reduces maintenance of the indexing mechanism 38.

The gear motor 90 continues to run at either the base speed 100 or the ramp-up speed 102 until one of the two events occur. The sensing of a pan leading edge A causes the motor to slow down to the base speed, while the reception of the timing signal B speeds the motor 90 up to the ramp-up speed. The end result is a waveform as in FIG. 5*a*. Because the drive train continues to move in a forward direction at all times, there is never backlash in the system except when the entire conveyor assembly is shut down, which may occur once a day, for example. This also reduce wear on the system and associated maintenance costs.

In the event that conditions change in the bakery production line, the indexing mechanism 38 can adapt with ease. With reference to FIG. 6, two potentiometers 120 and 122 are seen. The first potentiometer 120 is connected to adjust the ramp-up speed, while the second potentiometer 122 controls the base speed. When the frequency of the dough divider 40 changes, for example, the base speed 100 may need increasing. The base speed 100 is set to a medium speed according to the particular process speed. The ramp-up speed 102 is always higher than the base speed 100, and the ramp-up speed and base speed are adjusted by the operator to optimize throughput of the system.

Figure 5B:
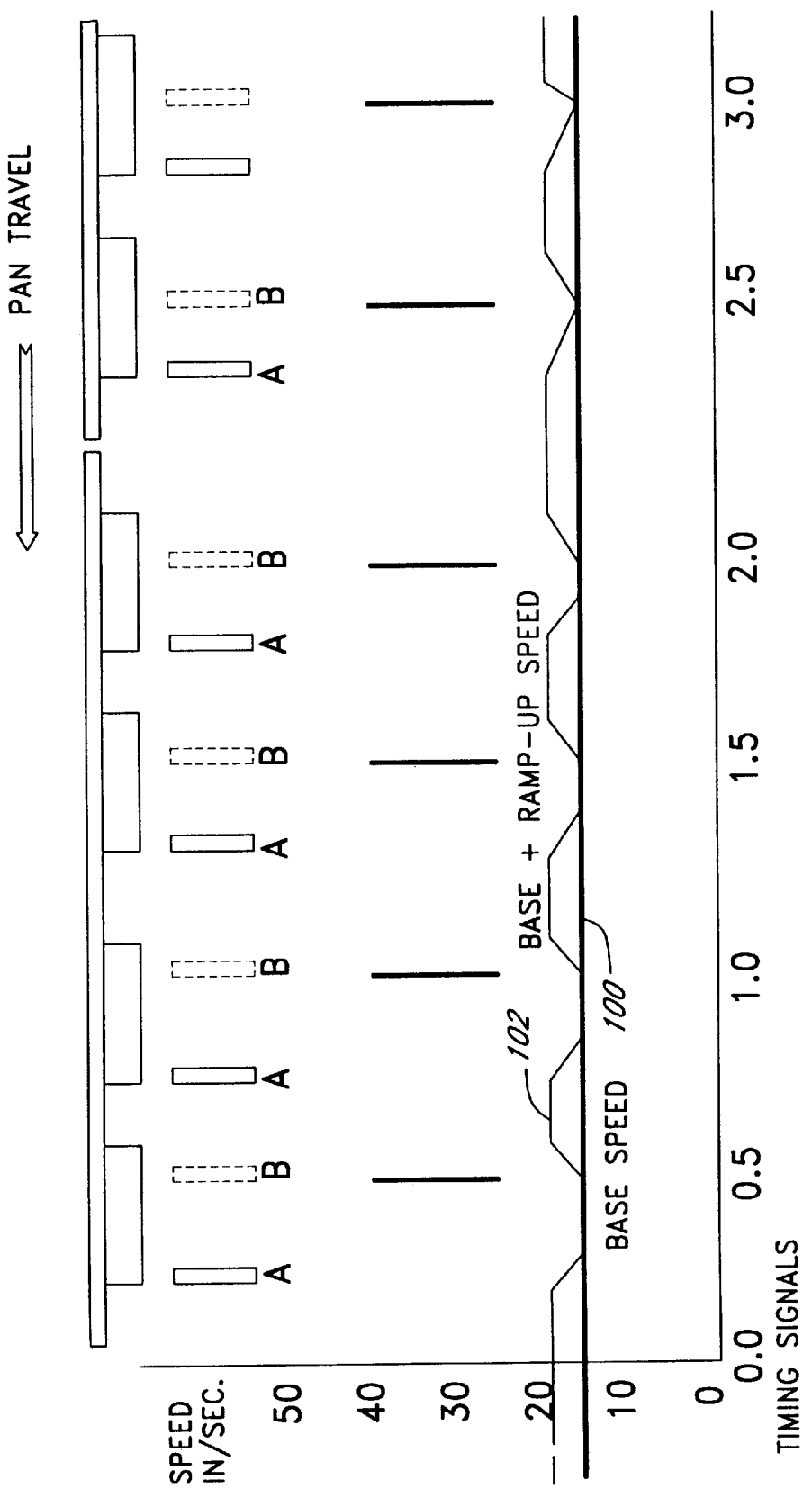
FIG. 5b is a schematic diagram illustrating the magnitude of speed of a pan conveyor in the indexing mechanism of the present invention wherein a base speed is high and a dough packet frequency is low.
Figure 5C:
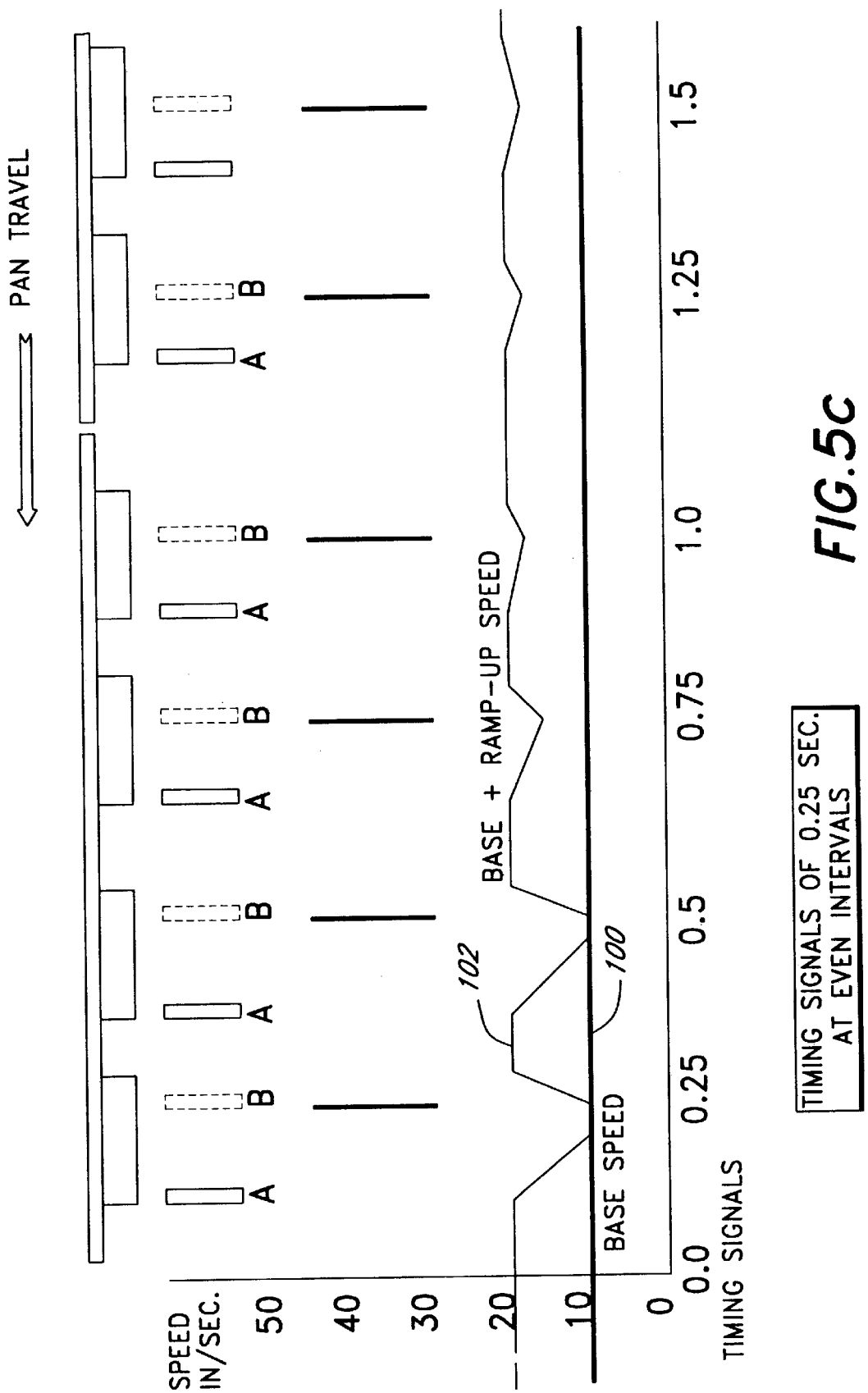
FIG. 5c is a schematic diagram illustrating the magnitude of speed of a pan conveyor in the indexing mechanism of the present invention wherein a base speed is low and a dough packet frequency is high.
Figure 5D:
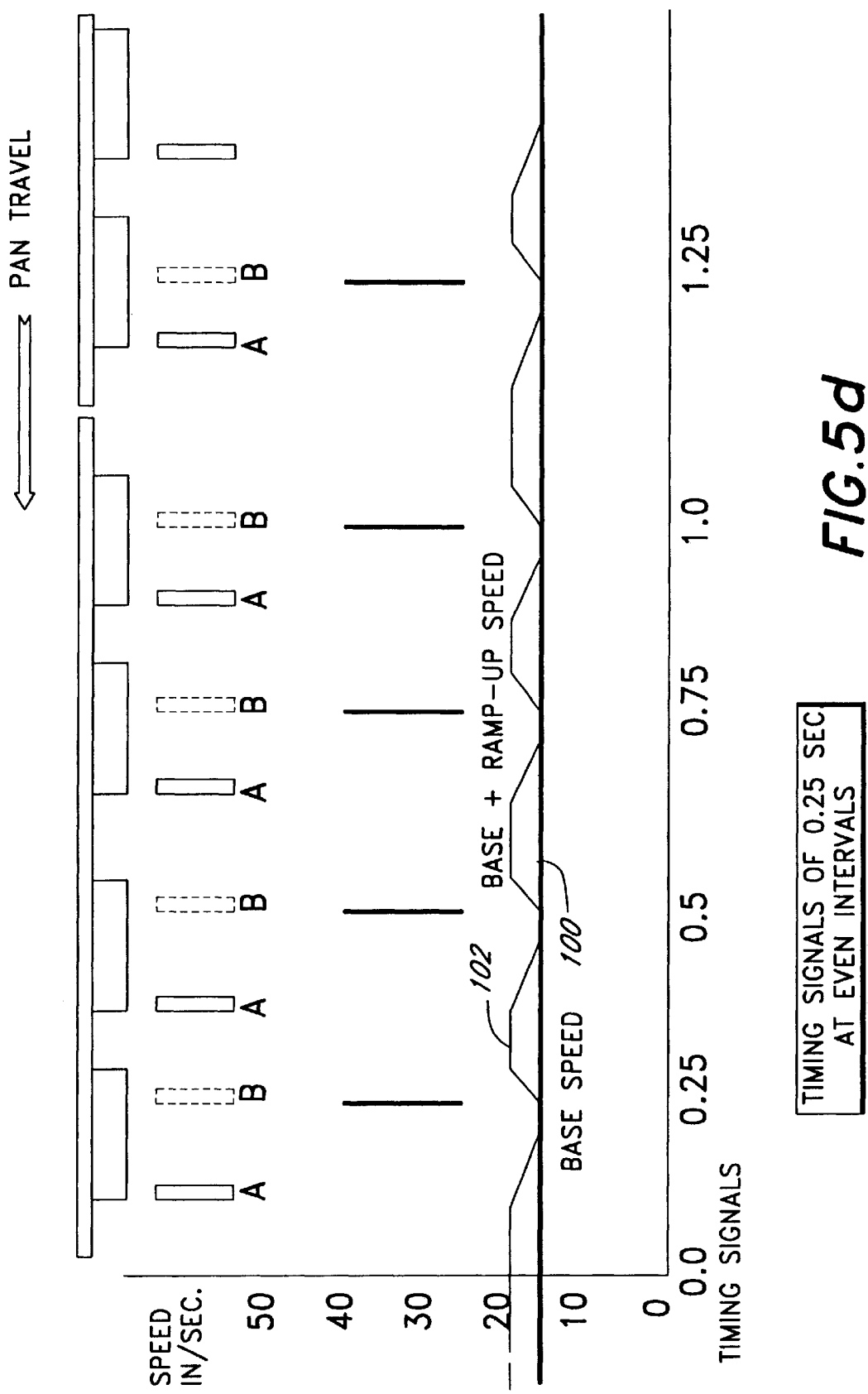
FIG. 5d is a schematic diagram illustrating the magnitude of speed of a pan conveyor in the indexing mechanism of the present invention wherein a base speed and dough packet frequency are both high.

Other examples of base speed 100 and ramp-up speed 102 combinations are seen in the diagrams of FIGS. 5*b–c*. FIG. 5*b* shows a relatively high base speed 100 and a low ramp-up speed 102. FIG. 5*c* shows a relatively low base speed 100 and a high ramp-up speed 102, along with a high frequency timing signal B. Finally, FIG. 5*d* shows a relatively high base speed 100 and a low ramp-up speed 102, with a high frequency timing signal B. Changes between these varying conditions may occur multiple times in any one production run, and the present system ensures optimization of throughput with a minimum of adjustment.

A suitable inverter 108 may be obtained from Urodrive, while a programmable controller is available from Allen Bradley. The various relays, switches, and input and output terminals for the circuit of FIG. 6 are self-explanatory and will not be further described. The various conveyor components used in the system 30 are conventional and available from a number of bakery production or other mechanical supply sources.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent, for example, either a separate gear motor or a vector controller system may be used to achieve movement. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. Apparatus for manufacturing bakery products from dough packets deposited into pockets of bakery pans, each pocket having a leading edge and a trailing edge, including a variable speed motor, a conveyor driven by the motor for moving the pans in series along a predetermined path, a signal generator which provides a timing signal at equal intervals, a sensor along the path which provides a position signal each time the leading edge of a pocket reaches a predetermined point along the path, an inverter connected to the motor which is responsive to the timing and position signals to regulate the speed of the motor, said inverter signaling the motor to operate at a constant base speed each time the position signal is received by the inverter, and at a second speed greater than the base speed, said second speed being equal to the base speed plus a constant incremental speed added to the base speed each time the timing signal is received by the inverter.

2. The apparatus of claim 1 including a manually adjustable regulator for setting the base speed.

3. The apparatus of claim 1 including a manually adjustable regulator for setting the constant incremental speed.

4. The apparatus of claim 1 where the motor is a gear motor.

\* \* \* \* \*